United States Patent
Michel et al.

(10) Patent No.: US 8,894,077 B2
(45) Date of Patent: Nov. 25, 2014

(54) DEVICE FOR ADJUSTING CAMBER AND/OR TOE

(75) Inventors: Wilfried Michel, Riedenburg (DE); Karl-Heinz Meitinger, Munich (DE); Christoph Kossira, Ingolstadt (DE); Hugo Müller, Rohrenfels-Ballersdorf (DE); Wolfgang Schmid, Freising (DE)

(73) Assignee: Audi AG, Ingolstadt (DE)

( * ) Notice: Subject to any disclaimer, the term of this patent is extended or adjusted under 35 U.S.C. 154(b) by 147 days.

(21) Appl. No.: 13/391,540

(22) PCT Filed: Jul. 17, 2010

(86) PCT No.: PCT/EP2010/004375
§ 371 (c)(1),
(2), (4) Date: May 3, 2012

(87) PCT Pub. No.: WO2011/020534
PCT Pub. Date: Feb. 24, 2011

(65) Prior Publication Data
US 2012/0242053 A1    Sep. 27, 2012

(30) Foreign Application Priority Data
Aug. 21, 2009 (DE) .......................... 10 2009 038 423

(51) Int. Cl.
*B60G 7/02* (2006.01)
*B62D 17/00* (2006.01)
*B60G 17/016* (2006.01)
*B60G 7/00* (2006.01)

(52) U.S. Cl.
CPC ............ *B60G 7/006* (2013.01); *B60G 2200/46* (2013.01); *B60G 2206/50* (2013.01); *B60G 2200/462* (2013.01); *B62D 17/00* (2013.01); *B60G 2204/419* (2013.01)
USPC .............. 280/86.754; 280/86.751; 280/5.521; 280/5.52

(58) Field of Classification Search
CPC ............... B60G 7/006; B60G 2200/46; B60G 2200/462; B60G 2204/419; B60G 2206/50; B62D 17/00
USPC ..................... 280/86.754, 86.751, 5.521, 5.52
See application file for complete search history.

(56) References Cited

U.S. PATENT DOCUMENTS

| 6,561,304 B1 | 5/2003 | Henry |
| 8,313,110 B2 * | 11/2012 | Meitinger et al. ......... 280/5.521 |
| 2004/0080223 A1 | 4/2004 | Shimizu |
| 2006/0017251 A1 | 1/2006 | Taneda |

FOREIGN PATENT DOCUMENTS

| AT | 68 873 E | 1/1914 |
| CN | 1424970 A | 6/2003 |

(Continued)

*Primary Examiner* — Joseph M Rocca
*Assistant Examiner* — Joselynn Y Sliteris
(74) *Attorney, Agent, or Firm* — Henry M Feiereisen LLC

(57) ABSTRACT

A device for adjusting the camber and/or the toe of a vehicle wheel of a motor vehicle includes a wheel carrier, which has a wheel-side carrier part and an axle-side guide part, between which rotary parts that can be rotated relative to each other are arranged, wherein at least one of the rotary parts can be adjusted in both rotational directions by means of a drive and a gear stage in order to adjust the toe and/or the camber. The gear stage for the rotary part is configured as harmonic drive gear train having a driving, elliptical drive disk, and a stationary, internally toothed ring gear.

16 Claims, 4 Drawing Sheets

(56) References Cited

FOREIGN PATENT DOCUMENTS

| DE | 10 2004 049 296 A1 | 4/2006 |
| DE | 102008011367 | 4/2009 |
| DE | 102008048568 | 3/2010 |
| EP | 1752321 A1 | 2/2007 |
| EP | 2 060 416 | 5/2009 |
| JP | 2002247713 A | 8/2014 |
| WO | WO 98/16418 | 4/1998 |
| WO | WO 2008/061619 A1 | 5/2008 |
| WO | WO 2009/052914 A1 | 4/2009 |

* cited by examiner

DEVICE FOR ADJUSTING CAMBER AND/OR TOE

CROSS-REFRENCES TO RELATED APPLICATIONS

This application is the U.S. National Stage of International Application No. PCT/EP2010/004375, filed Jul. 17, 2010, which designated the United States and has been published as International Publication No. WO 2011/020534 A2 and which claims the priority of German Patent Application, Serial No. 10 2009 038 423.5, filed Aug. 21, 2009, pursuant to 35 U.S.C. 119(a)-(d).

BACKGROUND OF THE INVENTION

The invention relates to a device for adjusting camber and/or toe of the wheels of wheel suspensions, in particular for motor vehicles.

A generic device for adjusting camber and/or toe of a vehicle wheel of a motor vehicle is known from DE 10 2004 049 296 A1. The device has a wheel carrier, which includes a wheel-side carrier part and an axle-side guide part. Arranged between these are rotary parts which are rotatable relative to one another, with at least one of the two rotary parts being adjustable in both rotational directions via a drive and a transmission stage for setting camber and/or toe.

The rotary parts arranged between the carrier part and the guide part, can be rotated as desired according to a set value input with the assistance of respectively associated drive units. The desired camber/toe setting is established in dependence on the combination of the rotation angles. This means, the wheel-side carrier part can be inclined up to several angular degrees relative to the guide part, which is immovably connected to the control arms. A prerequisite for this is, however, the provision of two separate drives which can rotate the two rotary parts independently of one another. The drive units are normally configured for high rotation speeds at small torque and gear down via a transmission stage. This results in high torque at a predefined power output. The transmission can be designed, for example, by a spur gear stage, optionally by a planetary set.

SUMMARY OF THE INVENTION

It is an object of the invention to provide a device of a generic type which can be integrated into wheel suspensions in an especially space-saving manner, and which attains small adjustment forces and precise adjustment paths as a result of high achievable transmission ratios.

According to the invention, this object is solved by a device for adjusting camber and/or toe of a vehicle wheel of a motor vehicle, including a wheel carrier having a wheel-side carrier part and an axle-side guide part between which rotary parts are arranged which are rotatable relative to one another, wherein at least one of the rotary parts is adjustable in both directions of rotation via a drive and a transmission stage for adjustment of camber and/or toe, wherein the transmission stage for the rotary part is configured as harmonic drive transmission with a driving, elliptical drive disk, a gear sleeve flexibly supported on the drive disk, and a stationary internally toothed ring gear.

According to the present invention transmission is not a spur gear stage or a planetary set; Rather the transmission is configured for at least one of the rotary parts as harmonic drive transmission with a driving, elliptical drive disk, a gear sleeve flexibly supported on the drive disk, and a stationary, internally toothed ring gear. These types of harmonic drive transmissions are known per se from the state of the art. The driven gear sleeve has a lower number of teeth than the ring gear so that a difference in rotation angle relative to the stationary ring gear is generated in each revolution of the driving drive disk and used for the adjustment. This allows the realization of transmission ratios of for example 50 to 100 to enable a particularly smooth and precise adjustment of the rotary part while requiring only small installation space, in particular in radial extension.

In order to reduce the number of components, the harmonic drive transmission is comprised of few compact parts and can provide high transmission ratios in a most compact installation space. Thus, the elliptical drive disk, i.e. the wave generator, the gear sleeve flexibly supported on the latter, and the stationary internally toothed ring gear constitute only three components that are required for the transmission. The rotational moment of inertia encountered during operation is thereby very small.

For a compact configuration, the harmonic drive transmission, in particular the elliptical drive disk thereof, can be arranged, at least partially, radially within the rotary part. The rotary part can be configured hollow-cylindrical with an internal mounting space in which the harmonic drive transmission can be partially arranged.

Preferably, the rotary part can at the same time also form the gear sleeve which is arranged between the ring gear and the drive disk of the harmonic drive transmission. In this case, the gear sleeve can be directly connected to the rotary part. The ring gear can at the same time be directly fastened to the carrier part or to the guide part, i.e. radially outside of the rotary part or the gear sleeve.

Particularly preferred can be the provision of a harmonic drive transmission for each of the rotary parts, with one of the transmissions being arranged on the carrier part and the second transmission being arranged on the guide part to act on the respective rotary parts, respectively.

A particularly favorable construction can further be realized when operating the harmonic drive transmission via an electric motor having a rotor which is supported in coaxial relationship to the elliptical drive disk of the transmission in the carrier part and/or in the guide part. This allows a particularly compact axial and radial arrangement of the entire servo drive within the wheel suspension. Preferably, the electric motor can be configured as hollow motor having a hollow space through which a cardan shaft can be guided.

To achieve a weight-saving construction, the drive disk and the rotor can each be arranged about a common bearing sleeve, with the stator of the electric motor being arranged in surrounding relationship to the rotor in the guide part and/or the carrier part. This also allows for example to guide a cardan shaft, which drives the wheel of the motor vehicle, through the construction up to the corresponding wheel flange.

A rigid and, with regard to manufacture, favorable construction is further achieved, when the bearing sleeve, which carries the rotor of the electric motor, is supported on both sides of the rotor via rolling bearings in the guide part and/or the carrier part.

Furthermore, the rotary parts can each be rotatably supported on an extended section of the bearing sleeve via respective rolling bearings and connected in driving relationship to the drive gear sleeve of the harmonic drive transmission, which gear sleeve is flexibly supported on the drive disk. In this way, manufacturing tolerances of the interacting functional parts can be advantageously controlled and a pre-assembled mounting unit can be created.

An additional coupling element can be arranged between the wheel-side carrier part and the axle-side guide part for allowing transmission of a torque, for example a braking torque, from the wheel-side carrier part to the axle-side guide part and thus to the vehicle body. The coupling element can be a metal bellows which cardanically connects the guide part to the carrier part, or a cardan joint which is arranged radially outside of the rotary parts. For space-efficient construction, the harmonic drive transmission can be arranged radially within the coupling element. Thus, for achieving a compact arrangement in radial direction, the internally toothed ring gear of the harmonic drive transmission, which interacts with the gear sleeve, can be positioned radially within cantilevers which are formed on the guide part and the carrier part and on which a cardan joint is supported which cardanically connects the guide part and the carrier part.

Finally, the carrier-side electric motor can be positioned within a wheel bearing which supports a wheel flange for a wheel of the motor vehicle and, optionally, a brake disk in a substantially uniform rotation plane relative to the wheel bearing to thereby attain a particularly structurally short and robust wheel bearing and arrangement of the electric motor. In terms of construction, the wheel flange can advantageously be configured in the shape of a cup and have a hub section which faces the vehicle interior and surrounds the carrier-side electric motor.

BRIEF DESCRIPTION OF THE DRAWING

In the following, an exemplary embodiment of the invention is explained with further details. The schematic drawing shows in.

DETAILED DESCRIPTION OF PREFERRED EMBODIMENTS

Figure 1:
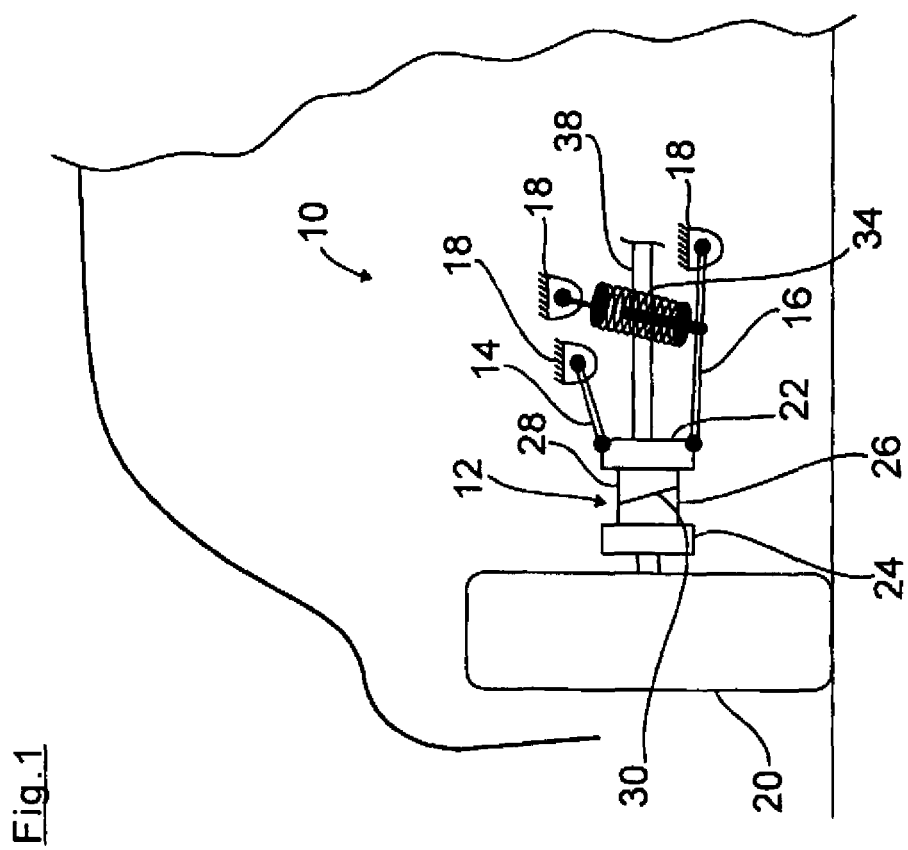
FIG. 1 a schematic illustration of a wheel suspension for motor vehicles with wheel guiding elements and a multipart wheel carrier with rotatable rotary parts for adjusting the camber and the toe of the wheel.

FIG. 1 shows a rear wheel suspension 10 for motor vehicles in a roughly schematic outline in which a wheel carrier 12 is articulated to a superstructure 18, which is only outlined, via transverse control arms 14, 16 as wheel guiding elements.

The wheel carrier 12, which rotatably receives the wheel 20, is subdivided into a guide part 22 which is articulated to the transverse control arms 14, 16, a carrier part 24 which receives the wheel 20 via a corresponding wheel bearing, and two rotatable rotary parts 26, 28 are supported on the guide part 22 and the carrier part 24 with confronting end-side slanted surfaces 30. The rotary part 26 is tiltable with its central axis 31 (compare FIG. 3) in relation to the rotary part 28 which can rotate about its rotation axis 32. A rotation of one or both rotary parts 26, 28 causes a tilting of the carrier part 24 relative to the guide part 22 and accordingly an adjustment of the camber and/or toe of the wheel 20 of the wheel suspension 10.

The wheel load is supported in a known manner against the superstructure 18 by a support spring 34. A telescopic shock absorber is arranged within the support spring 34. Further, the wheel 20 is driven via a cardan shaft 38, shown only as outline, of a drive assembly, with the cardan shaft 38 extending through the wheel carrier 12 and connected in driving relationship to the wheel 20.

Figure 2:
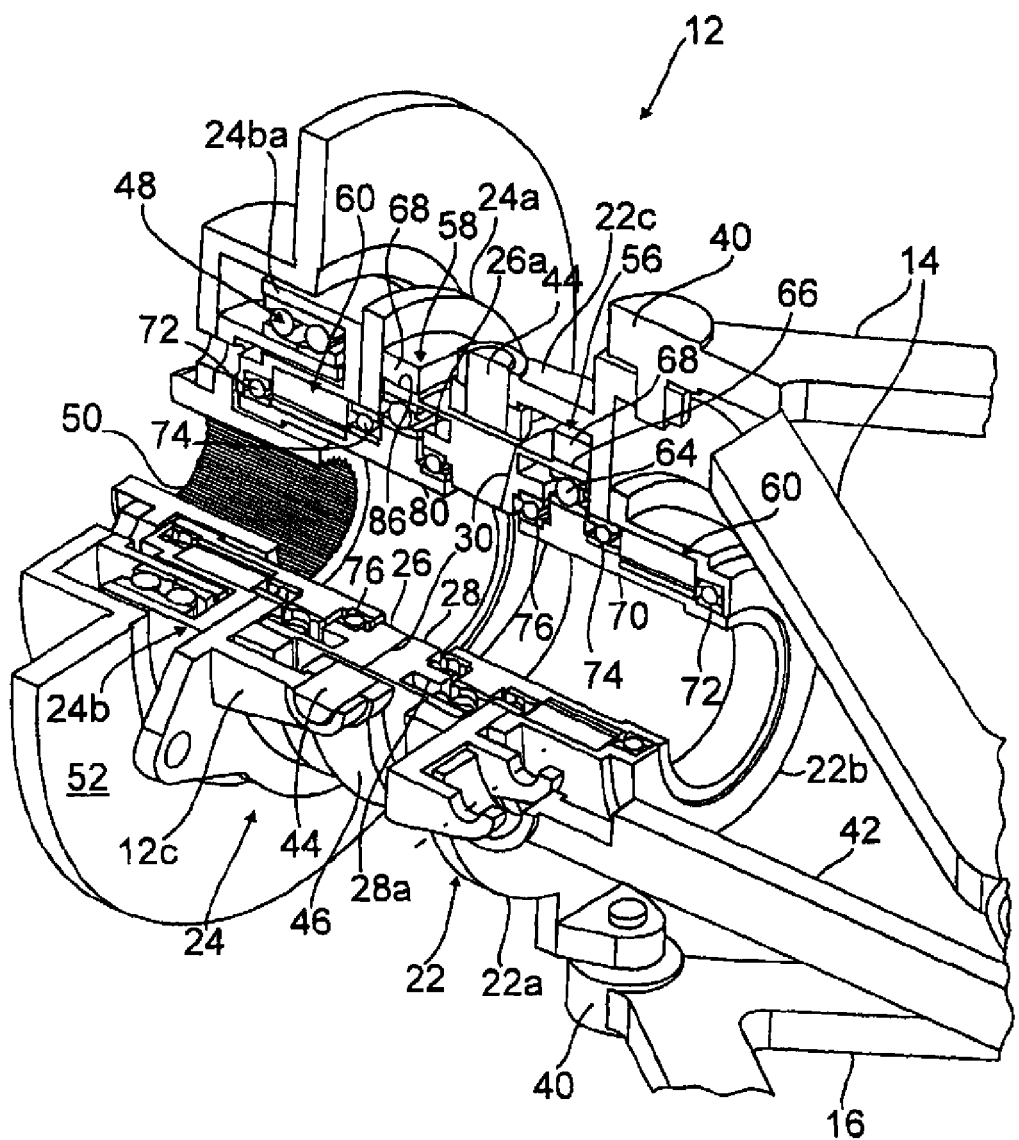
FIG. 2 a sectional representation of the wheel carrier according to FIG. 1, cut open by a 90° angle along the rotational axis of the wheel, with two harmonic drive transmissions to actuate the rotary parts.
Figure 3:
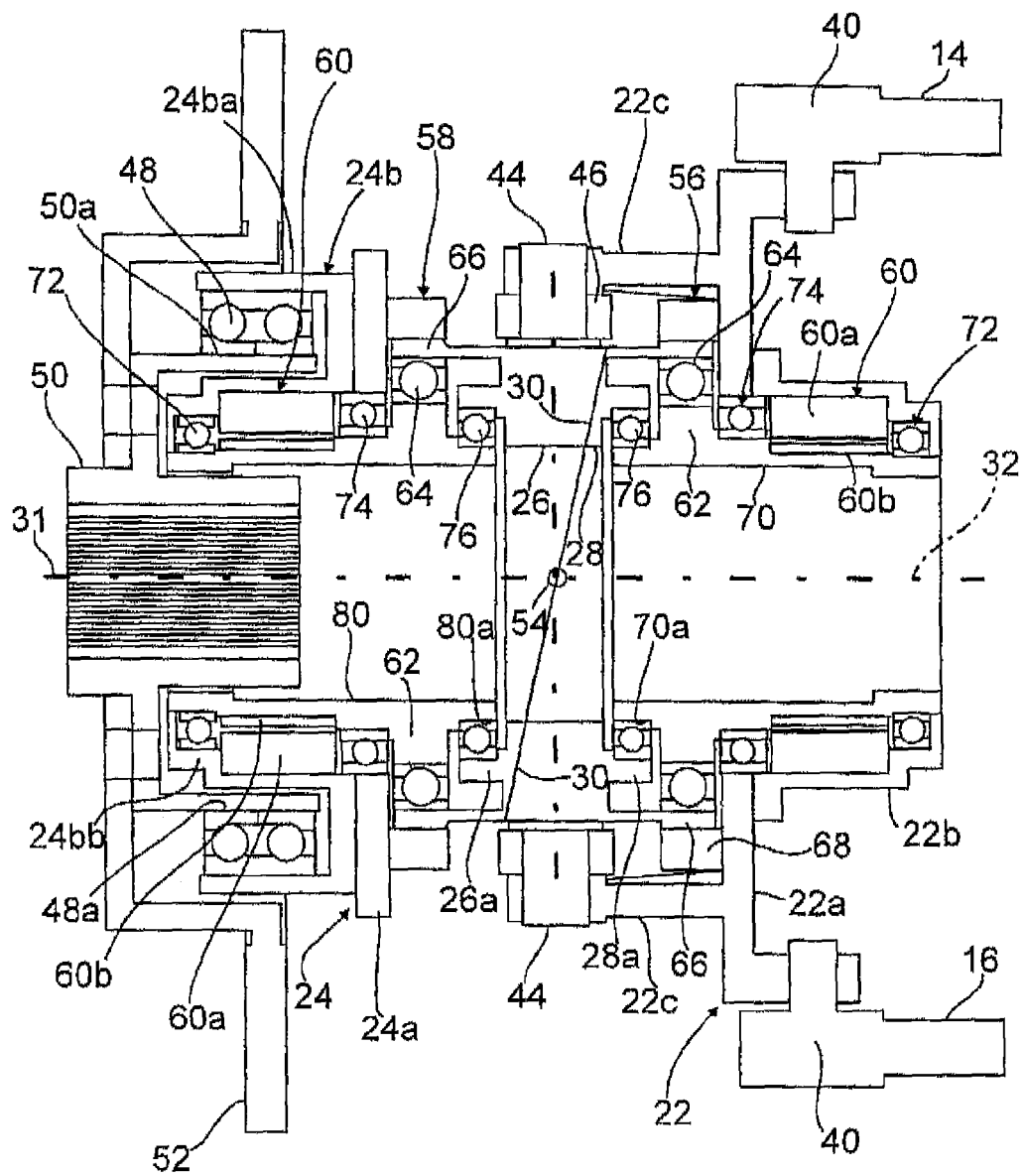
FIG. 3 a vertical longitudinal section of the wheel carrier according to FIGS. 1 and 2.

FIGS. 2 and 3 show the wheel carrier 12 of the wheel suspension 10 in detail.

The guide part 22 is articulated with a base plate 22a to the upper control arm 14, to the lower control arm 16, and to a control arm 42 not visible in FIG. 1, via hinges generally designated with 40, and carries a hub part 22b. Further, the guide part 22 has two diametrically opposed cantilevers 22c which horizontally protrude outwards and on which a support ring 46 is supported for limited rotation via pivot pins 44.

The carrier part 24 of the wheel carrier 12 also has a base plate 24a and a hub part 24b fastened thereto. Also protruding from the base plate 24a are two diametrically opposed cantilevers 12c which, however, are offset by 90° relative to the cantilevers 22c and protrude inwards and which are swingably connected to the support ring 46 via two further pivot pins 44. The cantilevers 12c, 22c jointly form with the support ring 46 a cardan joint which allows the carrier part 24 to pivot or tilt relative to the guide part 22, but to act in circumferential direction in a form-fitting manner.

On its outer circumferential wall 24ba, the hub part 24b of the carrier part 24 carries a dual-row ball bearing or wheel bearing 48 via which a wheel hub 50, which is provided with a splined toothing, is rotatably supported. Fastened on the wheel hub 50 by not shown wheel bolts, is a brake disk 52 of a disk brake of the motor vehicle and the wheel 20 (FIG. 1).

The two rotary parts 26, 28 are rotatably supported between the carrier part 24 and the guide part 22 of the wheel carrier 12 in coaxial relationship to the rotation axis 32, with their abutting end-side slanted surfaces 30 (compare FIG. 3) causing the tilting of the carrier part 24 in the vertical axis (camber adjustment) and/or the horizontal axis (toe adjustment) by rotating the rotary parts 26, 28 in the same or opposite directions. As shown in FIG. 3, the point of intersection 54 between the straight connecting lines of the joint axes of the pivot pins 44 with a straight connecting line of the slanted surfaces 30 lies exactly on the rotation axes 31, 32 of the rotary parts 26, 28.

The rotary parts 26, 28 are operated by two harmonic drive transmissions 52, 58 via coaxially arranged electric motors 60.

The harmonic drive transmissions 56, 58, which are known per se from the state of the art, are now described with reference to the exploded illustration of FIG. 4. For sake of simplicity, the reference signs are also used on the wheel carrier 12 in the following description.

Figure 4:
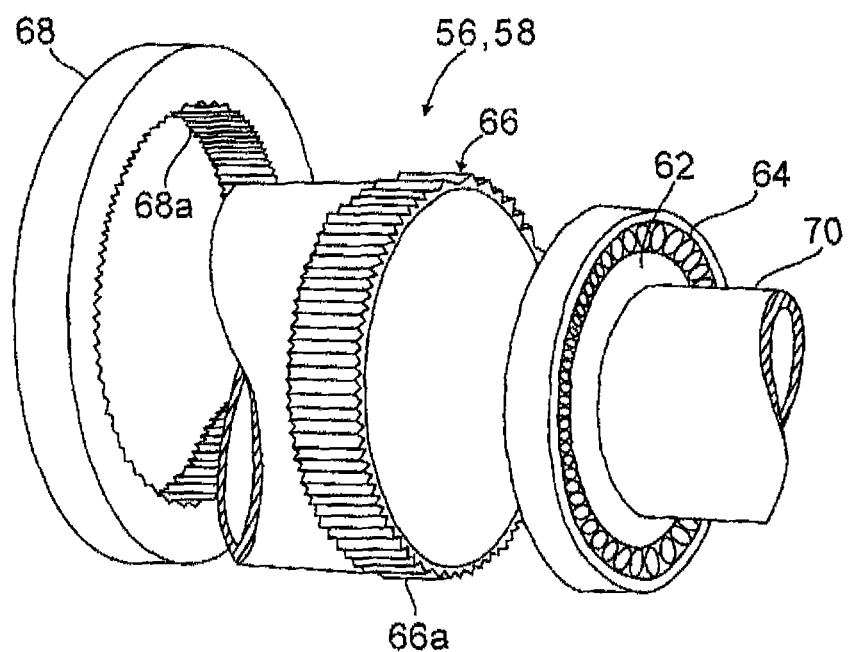
FIG. 4 a principle depiction of a harmonic drive transmission, according to the prior art.

The harmonic drive transmissions 56, 58 according to FIG. 4 include essentially a driving elliptical drive disk 62, i.e. a so-called wave generator, a flexible rolling bearing 64 arranged about the outer circumference of the drive disk, an outputting gear sleeve 66 which is formed by a flexible steel sleeve and has outer teeth 66a, and finally a stationary ring gear 68 which has internal teeth 68a.

The drive disk 62 is inserted with the rolling bearing 64 in the flexible gear sleeve 66 so that the drive disk 62 also adopts an elliptical outer shape.

The gear sleeve 66 in turn is inserted in the rotationally symmetric ring gear 68, with only several teeth of the gear sleeve 66 meshing with the ring gear 68. Further, the gear sleeve 66 is configured with fewer teeth than the ring gear 68.

When the drive disk 62 is driven about a rotation angle of 360° by the electric motor 60, the gear sleeve 66, which is flexibly guided via the rolling bearing 64, rolls off in the ring gear 68, whereby because of the lower number of teeth, the gear sleeve 66 is rotated in opposition to the driving direction of the drive disk 62 to a smaller degree relative to the stationary ring gear 68 to thereby cause the adjustment of the rotary parts 26, 28.

The harmonic drive transmissions 56, 58 (FIGS. 2 and 3) are arranged in coaxial relationship to the rotation axis 32 in the wheel carrier 12 and radially within the cantilevers 22a, 24a of the guide part 22 and the carrier part 24.

Thus, the driving drive disk 62 of the harmonic drive transmission 56 is configured in one piece with a bearing sleeve 70 which is rotatably supported in axial direction on both sides of the stator 60a of the electric motor 60 via rolling bearings 72, 74 in the guide part 22 and in the hub part 22b, respectively, and in the base part 22a.

The flexible rolling bearing 64, which suitably receives the gear sleeve 66, is arranged around the elliptical outer circumference of the drive disk 62.

The outputting gear sleeve 66 is formed onto the adjacent rotary part 28, with the rotary part 28 being rotatably supported on an extended section 70a of the bearing sleeve 70 via an attached bearing throat 28a and a further rolling bearing 76.

The gear sleeve 66 meshes with the ring gear 68 which is bolted to the base plate 22a of the guide part 22.

The rotor 60b of the electric motor 60 is arranged directly on the bearing sleeve 70 between the two rolling bearings 72, 74.

The arrangement of the harmonic drive transmission 58 and of the electric motor 60 in the carrier part 24 of the wheel carrier 12 is essentially a mirror image so that same reference signs are used for structurally identical parts.

Thus, the drive disk 62 is again formed on a bearing sleeve 80 which is rotatably supported in the carrier part 24 or base part 24a and an inner circumferential wall 24bb of the hub part 24b via rolling bearings 72, 74.

The flexible gear sleeve 66 is formed directly onto the axially adjoining rotary part 26 which in turn is rotatably supported on an extended section 80a of the bearing sleeve 80 via an attached bearing throat 26a and a rolling bearing 76.

The electric motor 60 is arranged in the hub part 24b between the two rolling bearings 72, 74 and has a stator 60a which is inserted in the hub part 24b, while its rotor 60b is formed directly on the bearing sleeve 80. As can be seen, the electric motor 60 lies advantageously essentially in a uniform rotation plane with the wheel bearing 48 which is arranged radially outside and has an inner bearing ring 48a positioned on a hub section 50a of the cup-shaped wheel hub 50.

The ring gear 68 of the harmonic drive transmission 58 is tightly bolted to the base plate 24a of the carrier part 24.

By activating the electric motors 60 in the one or other rotational direction, the rotary parts 26 28 can be rotated in the same or opposite directions by the harmonic drive transmissions 56 and/or 58 as described with reference to FIG. 4 in such a manner that a tilting the carrier part 24 relative to the guide part 22 of the wheel carrier 12 allows adjustment of the camber and/or toe of the wheel 20 of the wheel suspension 10 in a desired manner.

As the harmonic drive transmissions 56, 58 enable the implementation of the high transmission ratio, a sensitive, smooth camber and/or toe adjustment can be attained, which in addition has only small self-aligning torques which optionally may be decelerated.

The electric lines leading to the electric motors 60 and their connections to a corresponding electronic control device are not shown.

What is claimed is:

1. A device for adjusting camber and/or toe of a vehicle wheel of a vehicle, comprising:
   a wheel carrier having a wheel-side carrier part, an axle-side guide part, and rotary parts rotatable relative to one another and arranged between the wheel-side carrier part and the axle-side guide part; and
   a drivetrain for rotating at least one of the rotary parts in both rotational directions for establishing camber and/or toe, said drivetrain including a transmission stage configured in the form of a harmonic drive transmission having a driving, elliptical drive disk, a gear sleeve flexibly supported on the drive disk, and a stationary, internally toothed ring gear.

2. The device of claim 1, wherein the harmonic drive transmission is arranged at least partially radially within the at least one of the rotary parts.

3. The device of claim 1, wherein the elliptical drive disk of the harmonic drive transmission is arranged at least partially radially within the at least one of the rotary parts.

4. The device of claim 1, wherein the harmonic drive transmission is arranged at least partially radially within a hollow space of the at least one of the rotary parts.

5. The device of claim 1, wherein the elliptical drive disk of the harmonic drive transmission is arranged at least partially radially within a hollow space of the at least one of the rotary parts.

6. The device of claim 1, wherein the gear sleeve is fixedly connected to the at least one of the rotary parts.

7. The device of claim 1, wherein the ring gear is fastened to the carrier part or to the guide part.

8. The device of claim 1, wherein the ring gear is fastened to the carrier part or to the guide part radially outside of the at least one of the rotary parts.

9. The device of claim 1, wherein the drivetrain includes two of said harmonic drive transmission acting on the rotary parts in one-to-one correspondence, with one of the harmonic drive transmissions being arranged on the carrier part and the other one of the harmonic drive transmissions being arranged on the guide part.

10. The device of claim 1, wherein the drivetrain includes a drive constructed in the form of an electric motor having a rotor which is supported in at least one member selected from the group consisting of the carrier part and the guide part.

11. The device of claim 10, wherein the rotor is supported in the member in coaxial relationship to the elliptical drive disk.

12. The device of claim 10, further comprising a bearing sleeve commonly supporting the drive disk and the rotor.

13. The device of claim 10, wherein the electric motor has a stator which is arranged on the member in surrounding relationship to the rotor.

14. The device of claim 12, wherein the bearing sleeve is supported in the member on both sides of the rotor by rolling bearings.

15. The device of claim 12, wherein the bearing sleeve has an extended section for rotatable support of the at least one of the rotary parts via a rolling bearing.

16. The device of claim 15, wherein the at least one of the rotary parts is connected in driving relationship with the gear sleeve.

* * * * *